(12) United States Patent
Shiiba et al.

(10) Patent No.: US 6,626,797 B2
(45) Date of Patent: Sep. 30, 2003

(54) VEHICULAR CONTROL APPARATUS AND METHOD FOR CONTROLLING AUTOMATIC GEAR CHANGE

(75) Inventors: Kazuyuki Shiiba, Toyota (JP); Tomokazu Inagawa, Toyota (JP); Yoji Takanami, Toyota (JP); Yoshikazu Tanaka, Toyota (JP); Hideo Tomomatsu, Toyota (JP); Yoshio Ito, Toyota (JP); Teru Konishi, Anjo (JP); Masao Kawai, Anjo (JP)

(73) Assignees: Toyota Jidosha Kabushiki Kaisha, Toyota (JP); Aisin Aw Co., Ltd., Anjo (JP)

( * ) Notice: Subject to any disclaimer, the term of this patent is extended or adjusted under 35 U.S.C. 154(b) by 0 days.

(21) Appl. No.: 09/973,020

(22) Filed: Oct. 10, 2001

(65) Prior Publication Data

US 2002/0049116 A1 Apr. 25, 2002

(30) Foreign Application Priority Data

Oct. 11, 2000 (JP) ........................................ 2000-311243

(51) Int. Cl.[7] ............................................... F16H 59/66
(52) U.S. Cl. ......................................... 477/97; 477/901
(58) Field of Search .................... 477/97, 901; 701/55, 701/65

(56) References Cited

U.S. PATENT DOCUMENTS 5,911,771 A   6/1999   Reichart et al.
6,000,378 A  12/1999   Minowa et al.
6,098,005 A   8/2000   Tsukamoto et al.
2001/0049573 A1 * 12/2001 Ohashi et al. ............... 701/51

FOREIGN PATENT DOCUMENTS

| EP | 0 831 255 | 3/1998 |
|---|---|---|
| EP | 0 869 300 | 7/1998 |
| JP | 2000-46170 | 2/2000 |
| JP | 2000-65201 | 3/2000 |
| JP | 2000-142180 | 5/2000 |

* cited by examiner

Primary Examiner—Charles A Marmor
Assistant Examiner—Dennis Abdelnour
(74) Attorney, Agent, or Firm—Oblon, Spivak, McClelland, Maier & Neustadt, P.C.

(57) ABSTRACT

In the case where a cooperative gear change control of an automatic transmission is executed on the basis of information with respect to a condition around a vehicle or in front of a vehicle, in a cooperative gear change control means, a gear change of the automatic transmission is directly determined on the basis of actual curve information and road surface inclination information in accordance with a previously stored downshift map, and a gear stage is switched such that a determined gear change is executed. Therefore, it is possible to directly obtain the gear stage or the gear ratio corresponding to the curve of the road and the inclination of the road surface.

21 Claims, 10 Drawing Sheets

FIG. 3

|  | C0 | C1 | C2 | B0 | B1 | B2 | B3 | B4 | F0 | F1 | F2 |
|---|---|---|---|---|---|---|---|---|---|---|---|
| N |  | ○ |  |  |  |  |  |  |  |  |  |
| Rev |  |  | ○ | ○ |  |  |  | ○ |  |  |  |
| 1st | ○ | ○ |  |  |  |  |  | ● | ○ |  | ○ |
| 2nd | ● | ○ |  |  |  |  | ○ |  | ○ |  |  |
| 3nd | ○ | ○ |  |  | ● | ○ |  |  | ○ |  |  |
| 4th | ○ | ○ | ○ |  |  | △ |  |  | ○ | ○ |  |
| 5th |  | ○ | ○ | ○ |  | △ |  |  |  |  |  |

● ENGAGEMENT STATE (ENGINE BRAKE IS GENERATED)
○ ENGAGEMENT STATE

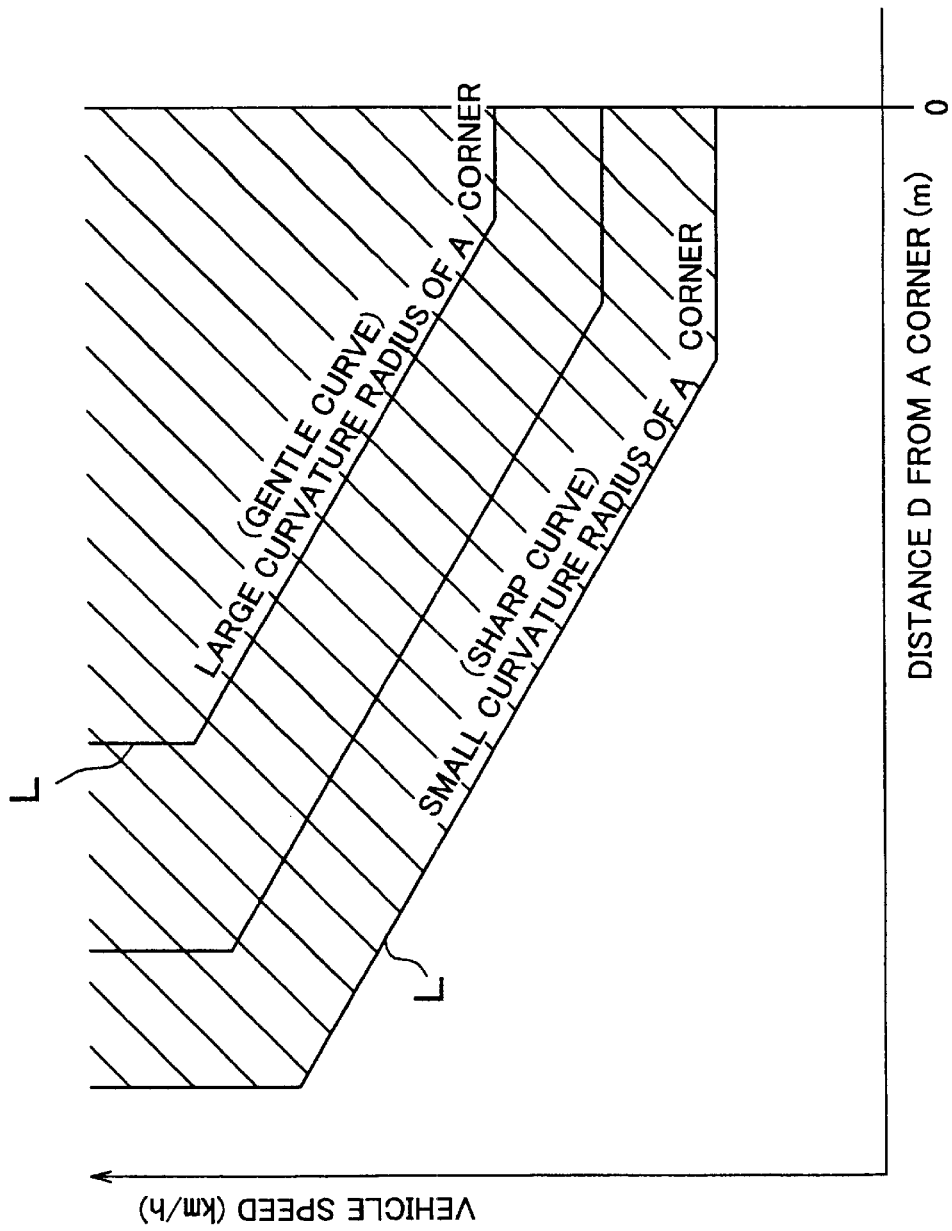

US 6,626,797 B2

VEHICULAR CONTROL APPARATUS AND METHOD FOR CONTROLLING AUTOMATIC GEAR CHANGE

INCORPORATION BY REFERENCE

The disclosure of Japanese Patent Application No. 2000-311243 filed on Oct. 11, 2000, including the specification, drawings and abstract is incorporated herein by reference in its entirety.

BACKGROUND OF THE INVENTION

1. Field of Invention

The invention relates to a vehicular control apparatus and a method for controlling a gear change which controls a gear change of an automatic transmission on the basis of information with respect to an inclination of a road surface where the vehicle is traveling and information with respect to a curve of the traveling road.

2. Description of Related Art

There have been proposed control apparatuses determining an inclination of a road surface on which a vehicle travels so as to select a gear change map corresponding to the inclination, determining on the basis of navigation information whether or not a mountainous road is a comparatively long ascending or descending slope road, and correcting an inclination parameter in the case where it is a comparatively long ascending or descending slope road so as to make it easy to switch to a gear change map corresponding to a large inclination. One of the examples is a control apparatus for controlling a gear shift of an automatic transmission described in Japanese Patent Laid-open Publication No. 2000-65201.

In this case, in the conventional control apparatus for controlling the gear change mentioned above, a determined inclination value is corrected on the basis of the inclination of the road surface, the gear change map is selected on the basis of a comparison between the determined inclination value and an actual inclination of the road surface, a gear change is determined on the basis of an actual vehicle speed and an accelerator opening degree in accordance with the gear change map, and a gear stage of an automatic transmission is switched such that a determined gear change is executed. Accordingly, in the conventional control apparatus for controlling the gear change described above, the gear stage corresponding to the curve of the road and the inclination of the road surface is not always selected. Therefore, there is a problem that the gear stage corresponding to the road condition can not be directly obtained.

SUMMARY OF THE INVENTION

The invention is made for the purpose of solving the above-mentioned problem, and an object of the invention is to provide a vehicular control apparatus for controlling a gear change in which a gear stage corresponding to a curve of a road and an inclination of a road surface can be directly obtained.

In order to achieve the object, there is provided a vehicular control apparatus for controlling an automatic gear change which executes a gear change control of an automatic transmission on the basis of information with respect to an inclination of a road surface where the vehicle is traveling, for example, executes a cooperative gear change control reflecting information with respect to the inclination of the road surface where the vehicle is traveling on the gear change of the automatic transmission, including a controller (a) detecting the inclination of the vehicle traveling road so as to output a road surface inclination information with respect to the inclination, (b) detecting a curve of the vehicle traveling road so as to output a curve information with respect to the curve, and (c) determining the gear change of the automatic transmission on the basis of actual curve information and road surface inclination information in accordance with a previously stored gear change map, and switching a gear stage such that a determined gear change is executed.

Further, in order to achieve the object, there is provided the following vehicular control method for controlling an automatic gear change.

That is, there is provided a vehicular control method for controlling an automatic gear change including steps of:

detecting an inclination of a vehicle traveling road;

detecting a curve degree of the vehicle traveling road;

determining a gear change of an automatic transmission on the basis of the road surface inclination and the curve degree in accordance with a previously stored gear change map; and executing a switching such that a gear stage of the automatic transmission becomes a determined gear stage.

Thus, the gear change of the automatic transmission is directly determined on the basis of the actual curve information and road surface inclination information in accordance with the previously stored gear change map using the controller. In addition, the gear stage is switched such that the determined gear change is executed. Therefore, the gear stage or a gear ratio corresponding to the curve of the road or the inclination of the road surface can be instantly obtained.

BRIEF DESCRIPTION OF THE DRAWINGS

The above and other objects, advantages, technical and industrial significance of this invention will be better understood by reading the following detailed description of preferred embodiments of the invention, when considered in connection with the accompanying drawings, in which:

FIG. 3 is a table illustrating a relation between a combination of frictional engagement apparatuses of the automatic transmission shown in FIG. 1 and gear stages obtained thereby;

FIG. 10 is a view showing a relation used by a downshift allowing means in determining whether a downshift should be allowed in a modified embodiment of the invention.

DETAILED DESCRIPTION OF PREFERRED EMBODIMENTS

In the following description and the accompanying drawings, the invention will be described in more detail in terms of preferred embodiments.

Figure 1:
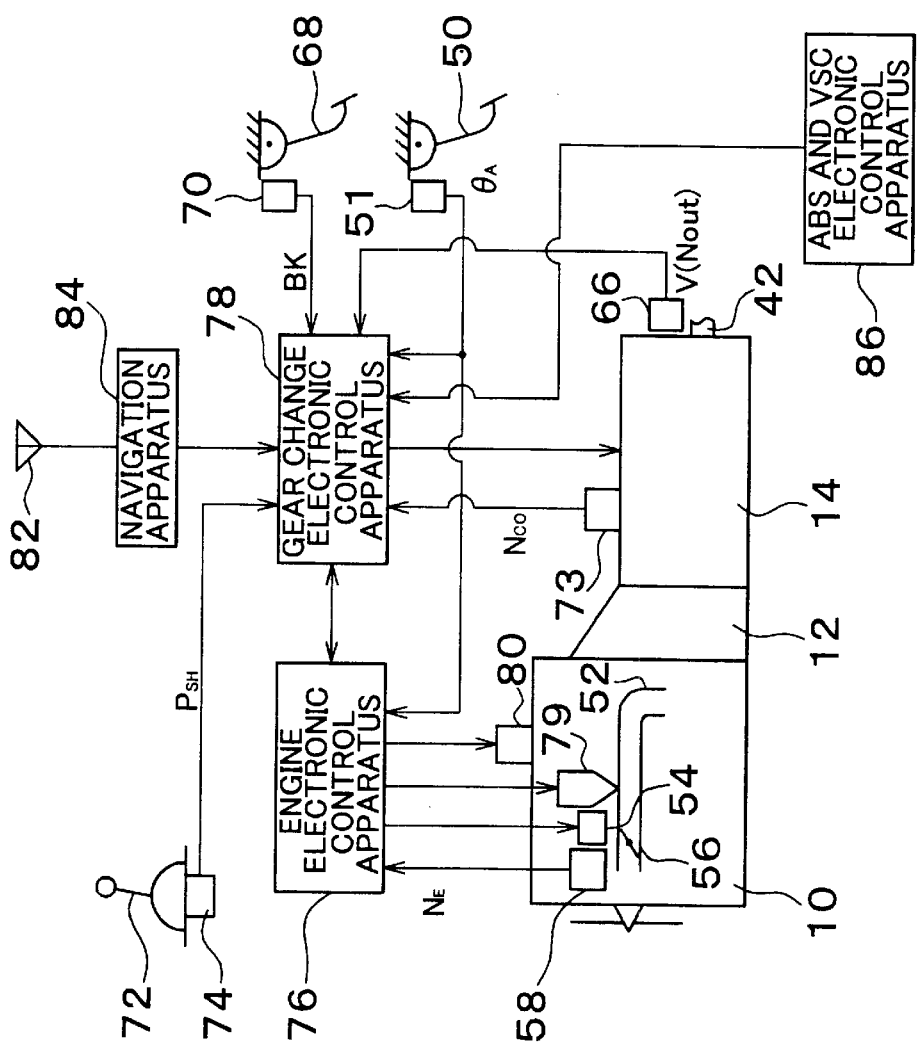
FIG. 1 is a block diagram illustrating a vehicular control apparatus including a control apparatus for controlling a gear change according to an embodiment of the invention.
Figure 2:
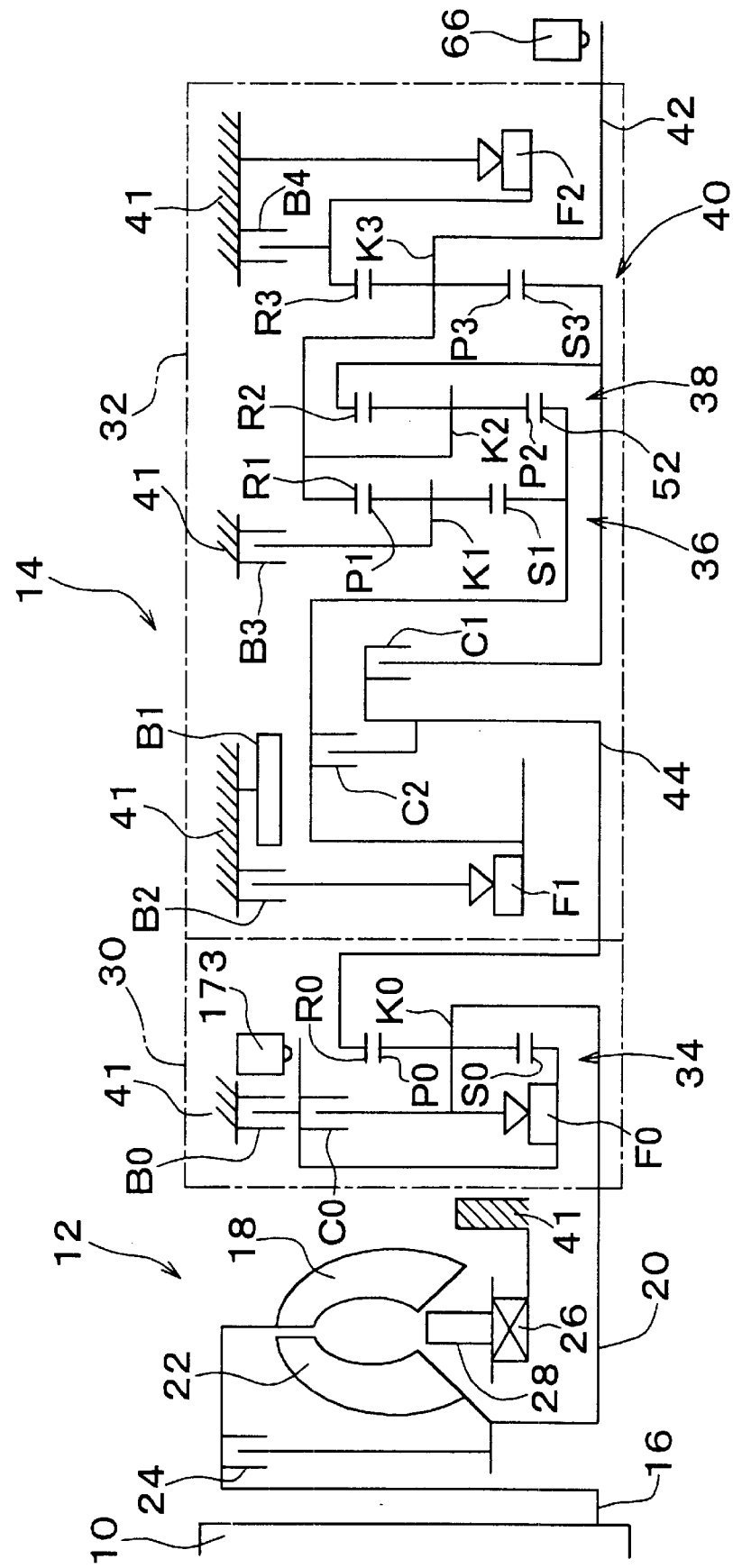
FIG. 2 is an outline view illustrating a structure of an automatic transmission shown in FIG. 1.

FIG. 1 is a view briefly illustrating a structure of a power transmitting apparatus and a control apparatus thereof in a vehicle to which a vehicular control apparatus for controlling a gear change according to the invention is applied. In FIG. 1, a prime mover 10 is composed of an internal combustion engine (an engine) and an electric motor or a combination thereof, or the like. However, in the following description, it will be described as an engine. An output of the prime mover 10 is inputted to an automatic transmission 14 via a torque converter 12, and is transmitted to drive wheels via a differential gear apparatus (not shown) and an axle. FIG. 2 is an outline view showing a structure of the torque converter 12 and the automatic transmission 14.

In FIG. 2, the torque converter 12 includes a pump impeller 18 connected to a crank shaft 16 of the engine 10, a turbine runner 22 connected to an input shaft 20 of the automatic transmission 14, a direct clutch, that is, a lockup clutch 24 that directly connects the pump impeller 18 and the turbine runner 22, and a stator 28 in which a rotation in one direction is prevented by a one-way clutch 26.

In FIG. 2, the automatic transmission 14 includes a first transmission 30 performing a two-stage switch of high and low, and a second transmission 32 capable of switching of a reverse gear stage and forward four stages. The first transmission 30 includes an HL planetary gear apparatus 34 composed of a sun gear S0, a ring gear R0 and a planetary gear P0 rotatably supported on a carrier K0 and engaged with the sun gear S0 and the ring gear R0, a clutch C0 and a one-way clutch F0 provided between the sun gear S0 and the carrier K0, and a brake B0 provided between the sun gear S0 and a housing 41.

The second transmission 32 includes a first planetary gear apparatus 36 composed of a sun gear S1, a ring gear R1 and a planetary gear P1 rotatably supported on a carrier K1 and engaged with the sun gear S1 and the ring gear R1, a second planetary gear apparatus 38 composed of a sun gear S2, a ring gear R2 and a planetary gear P2 rotatably supported on a carrier K2 and engaged with the sun gear S2 and the ring gear R2, and a third planetary gear apparatus 40 composed of a sun gear S3, a ring gear R3 and a planetary gear P3 rotatably supported on a carrier K3 and engaged with the sun gear S3 and the ring gear R3.

The sun gear S1 and the sun gear S2 are integrally connected to each other, the ring gear R1, the carrier K2 and the carrier K3 are integrally connected, and the carrier K3 is connected to an output shaft 42. Further, the ring gear R2 is integrally connected to the sun gear S3. Further, a clutch C1 is provided between the ring gear R2 and sun gear S3 unit and a middle shaft 44, and a clutch C2 is provided between the sun gear S1 and the sun gear S2, and the middle shaft 44. Further, a band type brake B1 for stopping a rotation of the sun gear S1 and the sun gear S2 is provided in the housing 41. Further, a one-way clutch F1 and a brake B2 are in series provided between the sun gear S1 and sun gear S2 unit and the housing 41. This one-way clutch F1 is constructed so as to be engaged when the sun gear S1 and the sun gear S2 are going to inversely rotate in a direction opposite to the input shaft 20.

A brake B3 is provided between the carrier K1 and the housing 41, and a brake B4 and a one-way clutch F2 are in parallel provided between the ring gear R3 and the housing 41. This one-way clutch F2 is constructed so as to be engaged when the ring gear R3 is going to reversely rotate.

The automatic transmission 14 is switched to any one of the reverse stage and forward five stages having sequentially different gear ratios, in accordance with an operation table, for example, a table shown in FIG. 3. In FIG. 3, an outline circle symbol denotes an engagement state, a blank column denotes a release state, and a black circle symbol denotes an engagement state at the time of generating an engine brake. For example, in the case where a shift lever 72 (see FIG. 1) is in a "D" range, when downshifting prior to a curve on a road during travel, for example, at a fifth speed gear stage, the clutch C0 is engaged and the brake B0 is released, whereby a 5-to-4 downshift is executed, and the clutch C2 is further released, whereby a 4-to-3 downshift is executed. On the contrary, in the case of upshifting from a third speed gear stage, the clutch C2 is engaged, whereby a 3-to-4 upshift is executed, and further the clutch C0 is released and the brake B0 is engaged, whereby a 4-to-5 upshift is executed.

FIG. 1 also shows a control apparatus provided in the vehicle. The control apparatus is constructed such that an accelerator opening degree θA (%) which is an operating amount of an accelerator pedal 50 is detected by an accelerator sensor 51. The accelerator pedal 50 is constructed so as to be largely pedaled by a driver in accordance with a required output, and corresponds to an acceleration operating member. A throttle valve 56 basically set at an opening angle (an opening degree) θTH (%) according to the accelerator opening degree θA by a throttle actuator 54 is provided in a suction pipe 52 of the engine 10. There are provided an engine rotational speed sensor 58 for detecting a rotational speed $N_E$ (r.p.m.) of the engine 10, a throttle sensor with an idle switch (not shown) for detecting a full close state of the throttle valve 56 and the opening degree θTH thereof, a vehicle speed sensor 66 for detecting a rotational speed NOUT (r.p.m.) of the output shaft 42, that is, a vehicle speed V, a brake switch 70 for detecting an operation of a brake pedal 68, an operating position sensor 74 for detecting an operating position PSH of a shift lever 72, an input shaft rotation sensor 73 for detecting a rotational speed NIN of the input shaft 20, that is, a rotational speed NC0 of the clutch C0 (=a turbine rotational speed NT), and the like. Signals representing the engine rotational speed NE, the accelerator opening degree θA, the throttle valve opening degree θTH, the vehicle speed V, the brake operation state BK, the operating position PSH of the shift lever 72, the input shaft rotational speed NC0 and a working oil temperature TOIL are supplied from the sensors to an engine electronic control apparatus 76 or a gear change electronic control apparatus 78.

The engine electronic control apparatus 76 and the gear change electronic control apparatus 78 shown in FIG. 1 are connected so as to be capable of communicating with each other, and a signal required for one is appropriately transmitted from the other. The engine electronic control apparatus 76 and the gear change electronic control apparatus 78 are so-called microcomputers including CPU, RAM, ROM and an input and output interfaces. The CPU processes the input signals on the basis of a program previously stored in the ROM while utilizing a temporary memory function of the RAM, and executes various kinds of controls.

For example, the engine electronic control apparatus 76 controls a fuel injection valve 79 for controlling a fuel injection amount, controls an igniter 80 for controlling an ignition timing, and controls the throttle valve 56 using the throttle actuator 54 for a traction control. Further, the engine electronic control apparatus 76 drives the throttle actuator 54 on the basis of an actual accelerator pedal operating amount Acc in accordance with a relation (not shown), in the control of the throttle valve 56, and basically increases the throttle valve opening degree θTH in accordance with an increase in the accelerator pedal operating amount Acc. Further, the engine electronic control apparatus 76 executes a torque reduction control during the gear change, and temporarily reduces the output of the engine 10 within a gear change period of the automatic transmission 14 for reducing a gear change shock.

Figure 4:
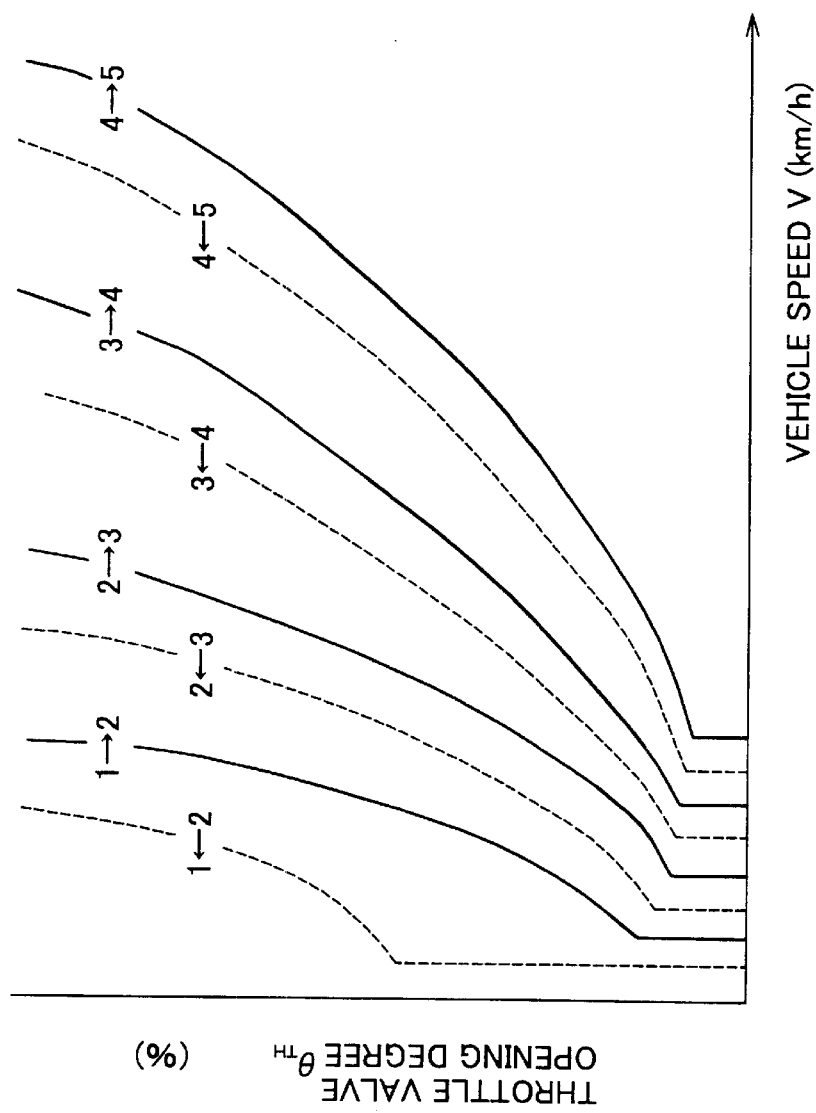
FIG. 4 is a graph showing a previously stored gear change graph used in an automatic gear change control, in a vehicle shown in FIG. 1.

Further, the gear change electronic control apparatus 78 determines a gear stage of the automatic transmission 14 on the basis of the accelerator opening degree θA and the vehicle speed V corresponding to an actual engine load, in accordance with a previously stored gear change graph, for example, a gear change graph shown in FIG. 4, and executes an automatic gear change control for controlling an electromagnetic valve of a hydraulic control circuit provided in the automatic transmission 14 so as to establish the determined gear stage. A solid line in FIG. 4 is an upshift line and a broken line shows a downshift line. Further, the above-mentioned gear change electromagnetic control apparatus 78 executes a cooperative (navigation) gear change control on the basis of a signal from a navigation apparatus 84 having an antenna 82 receiving a radio wave from a satellite and provided in the vehicle, a turning signal from an ABS and VSC electronic control apparatus 86 and the like, in addition to the automatic gear change control.

The navigation apparatus 84 receives a radio wave (a GPS signal) from the satellite via the antenna 82 by utilizing a GPS (global positioning system) so as to sequentially calculate a current position, sequentially displays the current position of the vehicle on a road within a previously stored map, determines a curvature radius R and a turning angle θ of a corner on a road around the vehicle, for example, a road in a traveling direction of the vehicle, and outputs a control signal corresponding to a road shape. For example, the road is stored by a plurality of node points, the curvature radius R of the corner is calculated on the basis of one certain node and nodes existing in front and at the rear thereof (totally three nodes), and an appropriate vehicle speed at which the vehicle can stably travels along the corner is determined on the basis of the radius of curvature R. Further, the turning angle 74 of the node is determined from a tangential line of a curved line obtained by smoothly connecting the respective nodes. The corner is defined, for example, as a gentle corner (20 degrees≦θ<40 degrees), a middle corner (40 degrees≦θ<95 degrees) or a hairpin corner (95 degrees≦θ according to the turning angle θ. An area from a position located a predetermined distance before the node to the node, or to a position set on the basis of the node is defined as a corner area. In this case, the position located the predetermined distance before the node or the position set on the basis of the node may be appropriately changed according to the kind of the respective corners.

The above-mentioned cooperative gear change control is a gear change control which is executed contrary to, that is, taking precedence over the automatic gear change control that establishes the gear stage determined in accordance with the gear change graph in FIG. 4. The cooperative gear change control is executed in order to stably travel along the curve on the road at the proper curve entering vehicle speed obtained by increasing the engine brake force, for example, at the time of coasting travel. In the conventional cooperative gear change control, for example, the curvature radius R in the curve area located in front of the vehicle is calculated, and an appropriate vehicle speed is calculated on the basis of the curvature radius R in accordance with a relation previously determined for the purpose of safely traveling. The relation is determined such that the appropriate vehicle speed becomes low as the curvature radius R becomes smaller. Next, a speed reduction curve (area) is determined on the basis of the appropriate vehicle speed and the distance to the curve area (the specific node point). The speed reduction curve indicates vehicle speeds for reducing a speed to the appropriate vehicle speed without causing uncomfortable feeling at each of the points before the specific node point on the curve for the purpose of traveling on the specific node point on the curve at the appropriate vehicle speed. Further, the current vehicle speed is compared with the speed reduction curve, and a recommended gear change stage is determined according to the position on the speed reduction curve where the current vehicle speed exists. Then, it is determined whether the current gear change stage should be maintained (the upshift is inhibited) or the downshift should be executed. The upshift inhibition or the downshift operation is commanded when the accelerator releasing operation or the brake operation is executed at a position located the predetermined distance before the curve area, and the gear change stage is maintained during traveling at the curve area. On the contrary, in the cooperative gear change control according to the embodiment of the invention, the upshift inhibition or the downshift operation is directly determined on the basis of the curvature radius R of the actual road curve, the road surface inclination θ R, and the traveling state of the vehicle in accordance with the previously stored gear change map, for example, a gear change map shown in FIGS. 5 and 6.

Figure 5:
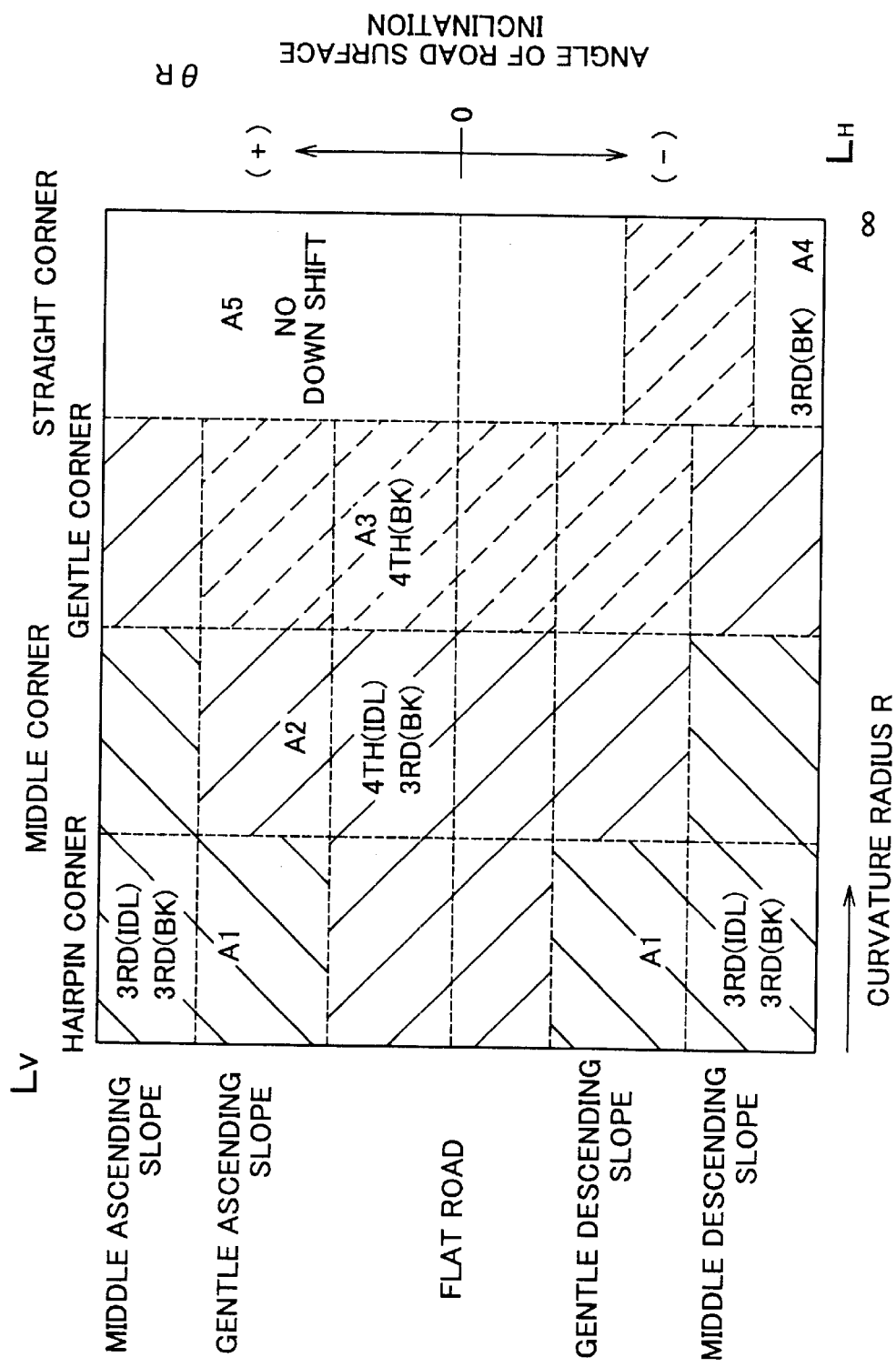
FIG. 5 is a view showing an example of a downshift map used for directly determining a downshift operation in a cooperative gear change control.

FIG. 5 is a downshift determining map having plural kinds of areas corresponding to drive operations within a two-dimensional coordinate composed of a horizontal axis LH representing the curvature radius R of a curved road in front of the vehicle and a vertical axis Lv representing an inclination θ R of the traveling road surface. The map is provided in order to further obtain a large climbing drive force or a large engine brake force at the time of descending a slope in comparison with the automatic gear change control using the gear change graph in FIG. 4. Further, in FIG. 5, there are provided a first downshift area A1, a second downshift area A2, a third downshift area A3, a fourth downshift area A4 and a non-downshift area A5.

The first downshift area Al corresponds to a road surface having a road condition requiring a comparatively large climbing drive force (engine brake force at the time of descending the slope), and having a sharp road curve (a small curvature radius R) and a steep (large) road surface inclination θ R. The gear change to the third speed gear stage is determined in the case where the points indicating the curvature radius R and the road surface inclination θ R exist within the area A1, it is determined that the speed reduction is required with respect to the appropriate vehicle speed mentioned above, and the releasing operation of the accelerator pedal 50 (the idle switch on) is executed or the operation of the brake pedal 68 (the brake switch on) is executed. The second downshift area A2 corresponds to a road surface having a road condition requiring a middle level of climbing drive force (engine brake force at the time of descending the slope), and having a middle level of road curve (a middle level of curvature radius R) and a middle level of road surface inclination θ R. The gear change to the fourth speed gear stage is determined in the case where the points indicating the curvature radius R and the road surface inclination θ R exist within the area A2, it is determined that the speed reduction is required with respect to the appropriate vehicle speed mentioned above, and the releasing operation of the accelerator pedal 50 (the idle switch on) is executed. The gear change to the third speed gear stage is determined in the case where the points indicating the curvature radius R and the road surface inclination θ R exist within the area A2, it is determined that the speed reduction is required with respect to the appropriate vehicle speed mentioned above, and the operation of the brake pedal 68 (the brake switch on) is executed. The third downshift area A3 corresponds to a road surface having a road condition requiring a comparatively small increase in climbing drive force (engine brake force at the time of descending the slope), and having a gentle road curve (a comparatively large curvature radius R) and a comparatively gentle (small) road surface inclination θ R. The gear change to the fourth speed gear stage is determined in the case where the points indicating the curvature radius R and the road surface inclination θ R exist within the area A3, it is determined that the speed reduction is required with respect to the appropriate vehicle speed mentioned above, and the operation of the brake pedal 68 (the brake switch on) is executed.

Further, the fourth downshift area A4 corresponds to a linear descending slope having a comparatively large inclination θ R and requiring a comparatively large engine brake. The gear change to the third speed gear stage is determined in the case where the points indicating the curvature radius R and the road surface inclination θ R exist within the area A4, it is determined that the speed reduction is required with respect to the appropriate vehicle speed mentioned above, and the operation of the brake pedal 68 (the brake switch on) is executed. The non-downshift area A5 corresponds to a linear climbing slope or a gentle descending slope requiring no increase in the engine brake force. The downshift is not determined irrespective of the drive operation state in the case where the points indicating the curvature radius R and the road surface inclination θ R exist within the area A5.

Figure 6:
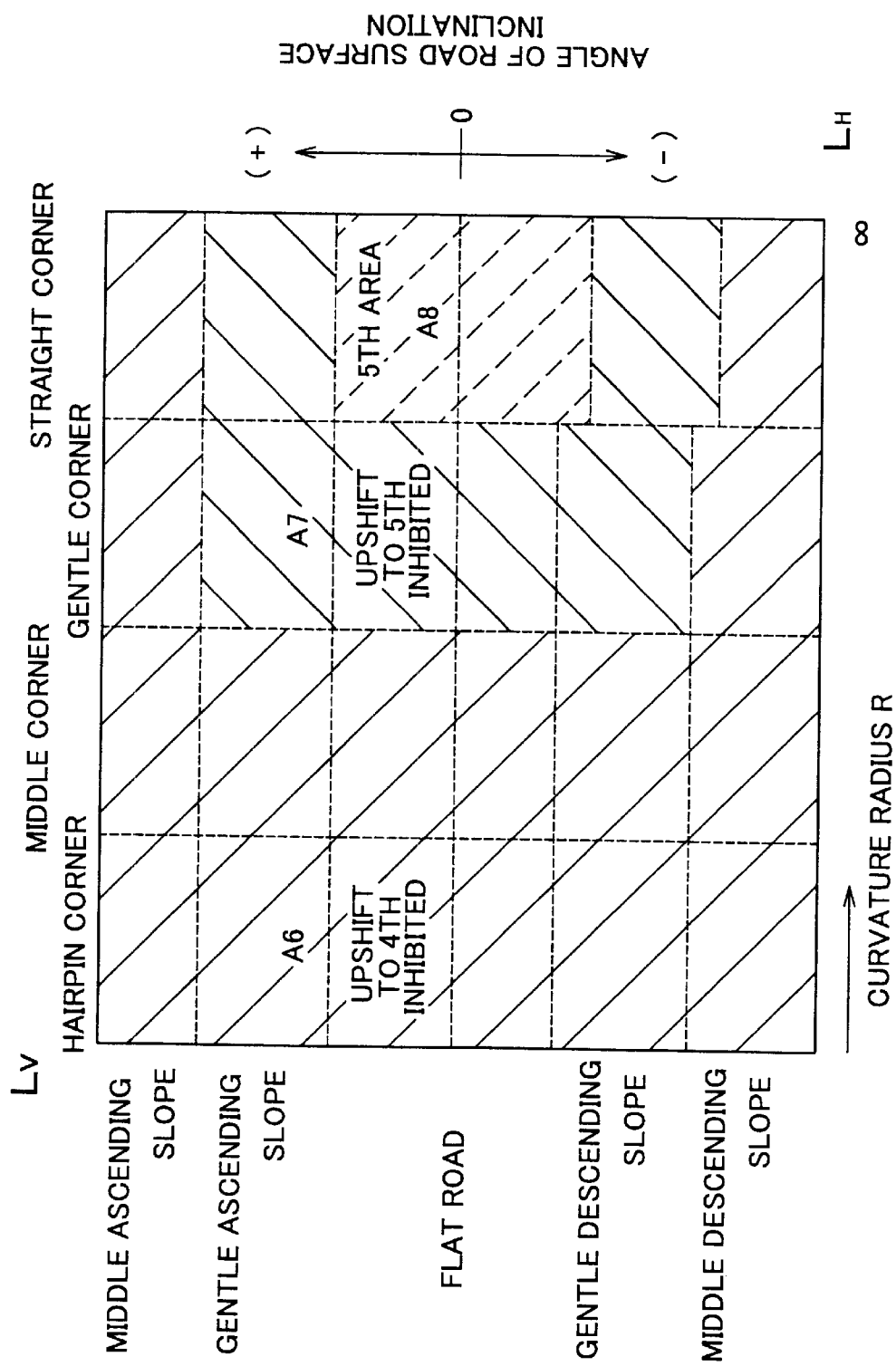
FIG. 6 is a view showing an example of an upshift map used for directly determining an upshift operation in the cooperative gear change control.

FIG. 6 is an upshift determining map having plural kinds of areas corresponding to drive operations within a two-dimensional coordinate composed of a horizontal axis LH representing the curvature radius R of a curved road in front of the vehicle and a vertical axis Lv representing an inclination θ R of the traveling road surface. The map is provided in order to maintain a climbing drive force or an engine brake force at the time of descending a slope which is increased by the downshift operation mentioned above. Further, in FIG. 6, there are provided a first upshift inhibiting area A6, a second upshift inhibiting area A7 and a fifth speed area A8. The first upshift inhibiting area A6 corresponds to an ascending and descending slope having a comparatively sharp curve (a small curvature radius R) and requiring maintaining a comparatively large driving force or engine brake force. The inhibition of the upshift to the fourth speed gear stage is determined in the case where the points indicating the curvature radius R and the road surface inclination θ R exist within the area A6. The second upshift inhibiting area A7 corresponds to the road surface having a gentle curve (a large curvature radius R) and a gentle road surface inclination θ R, and requiring maintaining a middle level or small driving force or engine brake force. The inhibition of upshift to the fifth speed gear stage is determined in the case where the points indicating the curvature radius R and the road surface inclination θ R exist within the area A7. The fifth speed area A8 corresponds to a linear road having a gentle inclination θ R which does not require maintaining a climbing drive force or an engine brake force at the time of descending on the slope. The upshift to the fifth speed gear stage is determined in the case where the points indicating the curvature radius R and the road surface inclination θ R exist within the area A8. In FIGS. 5 and 6, the respective areas may be set on the basis of the turning angle of the corner or a steering angle of the vehicle, instead of the curvature radius R. In brief, any elements indicating a degree of the curve of the corner may be employed.

Figure 7:
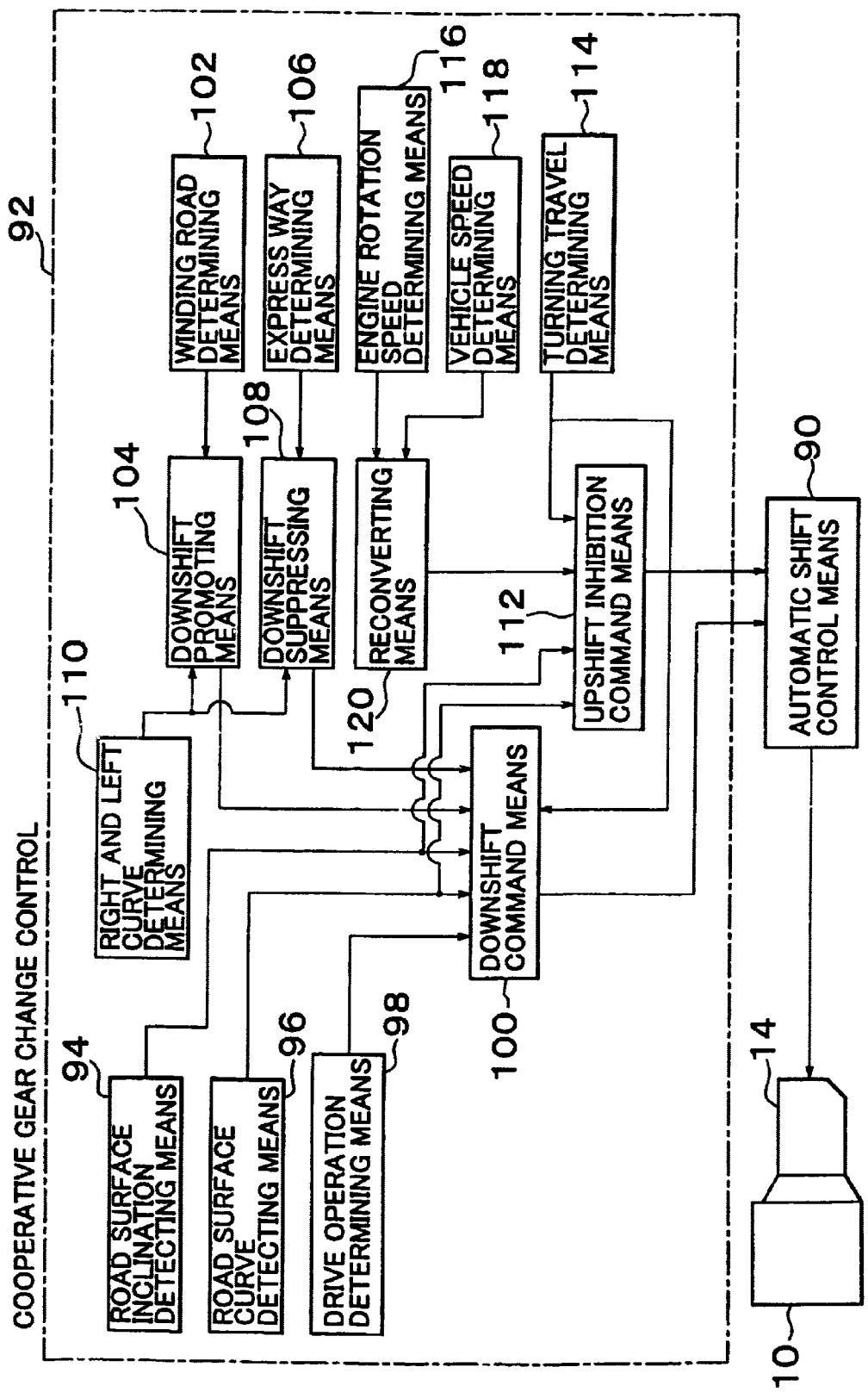
FIG. 7 is a function block diagram illustrating a main portion of a cooperative gear change control function in an electronic control apparatus for controlling a gear change shown in FIG. 1.

FIG. 7 is a function block diagram illustrating a main portion of a control function of the gear change electronic control apparatus 78. In FIG. 7, an automatic gear change control means 90 determines the gear stage of the automatic transmission 14 on the basis of the accelerator opening degree θ A and the vehicle speed V corresponding to the actual load of the engine 10, in accordance with the well-known previously stored gear change graph, for example, a gear change graph shown in FIG. 4. Then, the automatic gear change control means 90 controls an electromagnetic valve of a hydraulic control circuit (not shown) provided in the automatic transmission 14 so as to establish the determined gear stage.

A gear change control means, that is, a cooperative gear change control means 92 for executing a gear change control within a curve area directly determines the downshift operation, the upshift inhibition and the upshift operation of the automatic transmission 14 on the basis of the curvature radius R of the actual road (the curve information with respect to the curve of the road), the actual road surface inclination θ R (the road surface inclination information with respect to the road surface inclination) and the drive operation such as the accelerator releasing operation, the brake operation and the like, in accordance with the previously stored gear change map, for example, gear change maps shown in FIGS. 5 and 6, in order to increase the engine brake force so as to stably travel on the curve area of the road at the appropriate curve entering vehicle speed, to travel on the climbing road with the sufficient drive force, or to safely travel with the sufficient engine brake force at the time of entering the descending slope or the corner. Then, the cooperative gear change control means 92 executes a control such that the gear stage is switched to execute the determined gear change. In each of the downshift areas in FIG. 5, the downshift is determined on the basis of the accelerator releasing operation and the brake operation in the case of downshifting to the gear stage corresponding to the curvature radius R and the road surface inclination θ R. Therefore, the cooperative gear change control means 92 executes the downshift operation contrary to, that is, taking precedence over the automatic gear change control that establishes the gear stage determined in accordance with the gear change graph in FIG. 4. The cooperative gear change control means 92 executes the downshift operation provided that the accelerator pedal 50 is released or the accelerator opening degree θ A is reduced, or the brake pedal 68 is operated, when it is determined that the vehicle enters the curve area on the basis of the signal from the navigation apparatus 84.

The cooperative gear change control means 92 includes a road surface inclination detecting means 94 for calculating the inclination, that is, the slope θ R of the vehicle traveling road on the basis of a difference between a previously stored reference acceleration on a flat road surface and an actual vehicle acceleration, for example, in accordance with a previously stored relation so as to output the road surface inclination information including the slope θ R; a road surface curve detecting means 96 for forming a smooth curve passing through a plurality of continuous node points previously stored for specifically defining a center position of a road width, for example, within the curve area of the road located in front of the vehicle, for example, on the basis of the signal from the navigation apparatus 84, and calculating the curvature radius R of each of the node points on the basis of the curve so as to output the curve information including the curvature radius R; a drive operation determining means 98 for determining the releasing operation of the accelerator pedal 50 (the releasing operation of the accelerator pedal, that is, the idle switch on operation) or the pedaling operation of the brake pedal 68, that is, the brake switch on operation; and a downshift command means 100 for directly determining the downshift operation of the automatic transmission 14 on the basis of the curvature radius R of the actual road (the curve information with respect to the curve of the road), the actual road surface inclination θ R (the road surface inclination information with respect to the road surface inclination), and the drive operation such as the accelerator releasing operation, the brake operation and the like in accordance with the previously stored downshift map shown in FIG. 5, and executing the downshift operation taking precedence over the gear change of the automatic gear change control means 90.

Further, the cooperative gear change control means 92 mentioned above includes a winding road determining means 102 for determining on the basis of the signal from the navigation apparatus 84 whether or not the road in front of the vehicle is a continuous winding road; a downshift promoting means 104 for promoting the downshift operation, for example, by changing the downshift operation to the fourth speed gear stage shown in FIG. 5 to the third speed gear stage, in the case where it is determined that the road is a winding road by the winding road determining means 102; an express way determining means 106 for determining on the basis of the signal from the navigation apparatus 84 whether or not the vehicle travels on the express way; and a downshift suppressing means 108 for suppressing the downshift operation, for example, by reducing the downshift width in FIG. 5 by one stage or canceling the downshift operation to the third speed, in the case where it is determined that the vehicle travels on the express way by the express way determining means 106. In the case where it is determined that the road is a winding road by the winding road determining means 102, the downshift operation of the downshift command means 100 is promoted. However, in the case where it is determined that the vehicle travels on the express way by the express way determining mans 106, the downshift operation of the downshift command means 100 is suppressed.

Further, the cooperative gear change control means 92 includes a right and left curve determining means 110 for determining on the basis of the signal from the navigation apparatus 84 whether the curve of the road is a right curve or a left curve so as to promote the downshift operation of the downshift command means 100 in the left curve having a small curvature radius of a left-hand traffic road in comparison with the right curve having a large curvature radius; an upshift inhibition command means 112 for directly determining the inhibition of the upshift to the fourth speed or the fifth speed (maintaining a gear change stage) of the automatic transmission 14 on the basis of a curvature radius R (a curve information with respect to the curve of the road) of the actual road and an actual road surface inclination OR (a road surface inclination information with respect to the road surface inclination) in accordance with the previously stored upshift map in FIG. 6 so as to inhibit the upshift operation to the fourth speed or the fifth speed; and a turning travel determining means 114 for determining on the basis of a transverse acceleration detected by a G sensor mounted on the vehicle, a wheel speed difference between right and left, a steering angle of a steering wheel, a gyro signal mounted on the navigation apparatus 84 and the like whether or not the vehicle is turning so as to inhibit both of the downshift operation and the upshift operation executed by the downshift command means 100 if the vehicle is turning, in order to maintain a stability of a vehicle motion.

Further, the cooperative gear change control means 92 mentioned above includes an engine rotational speed determining means 116 for determining whether or not an engine rotational speed NE becomes equal to or more than a predetermined value NE1, for example, previously set to about 4000 to 5000 r.p.m.; a vehicle speed determining means 118 for determining whether or not a vehicle speed V becomes equal to or more than a predetermined value V1, for example, previously set to approximately 120 km/h; and a reconverting means 120 for executing the upshift operation in the case where the engine rotational speed NE becomes equal to or more than the predetermined value NE1 or the vehicle speed V becomes equal to or higher than the predetermined value V1 during the downshift operation executed in accordance with the cooperative gear change control, so as to reconvert the control mode from the cooperative gear change control mode to the normal automatic gear change control mode.

Figure 8:
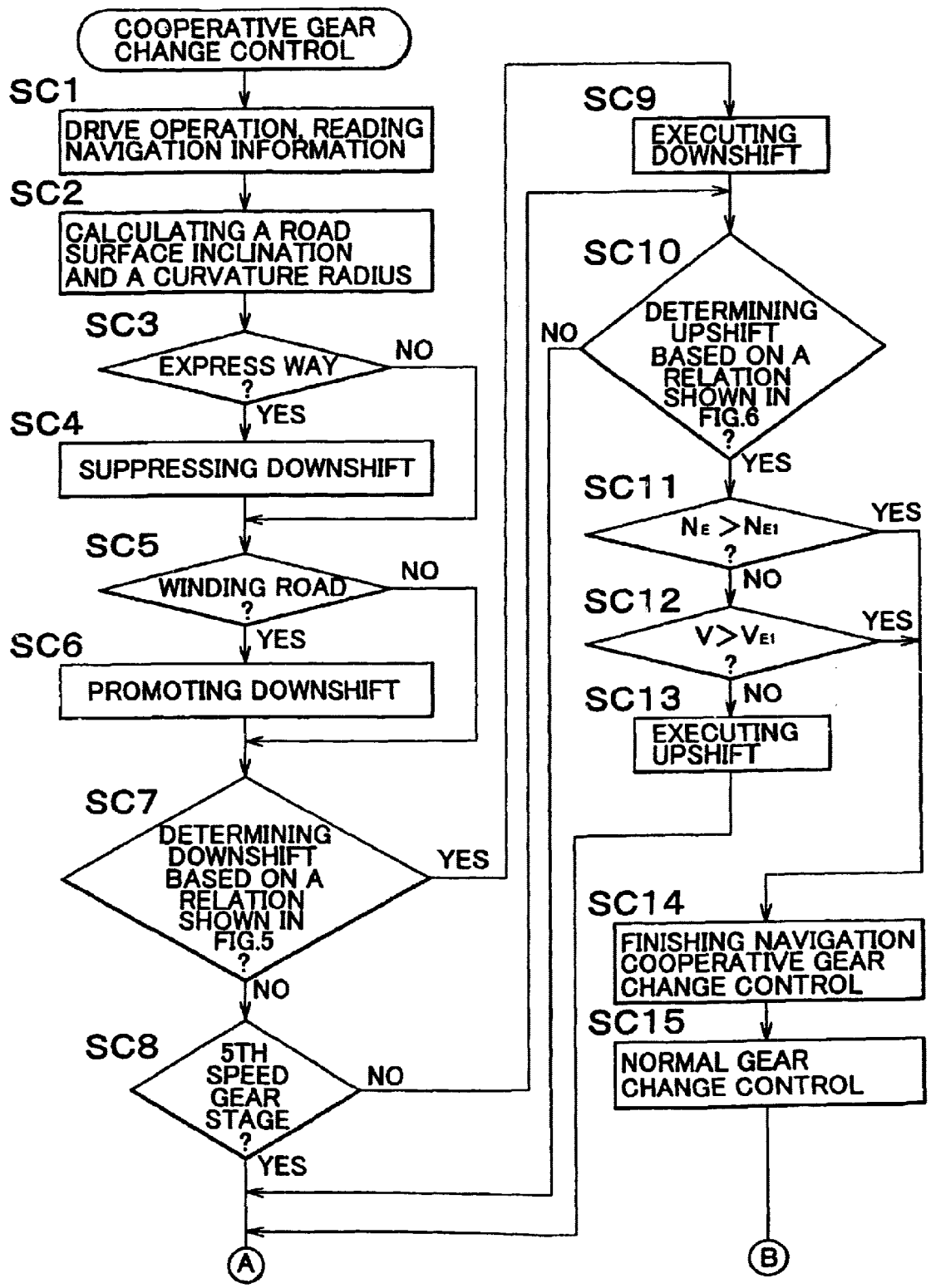
FIG. 8 is a part of a flowchart illustrating a main portion of the cooperative gear change control operation in the electronic control apparatus for controlling the gear change shown in FIG. 1.
Figure 9:
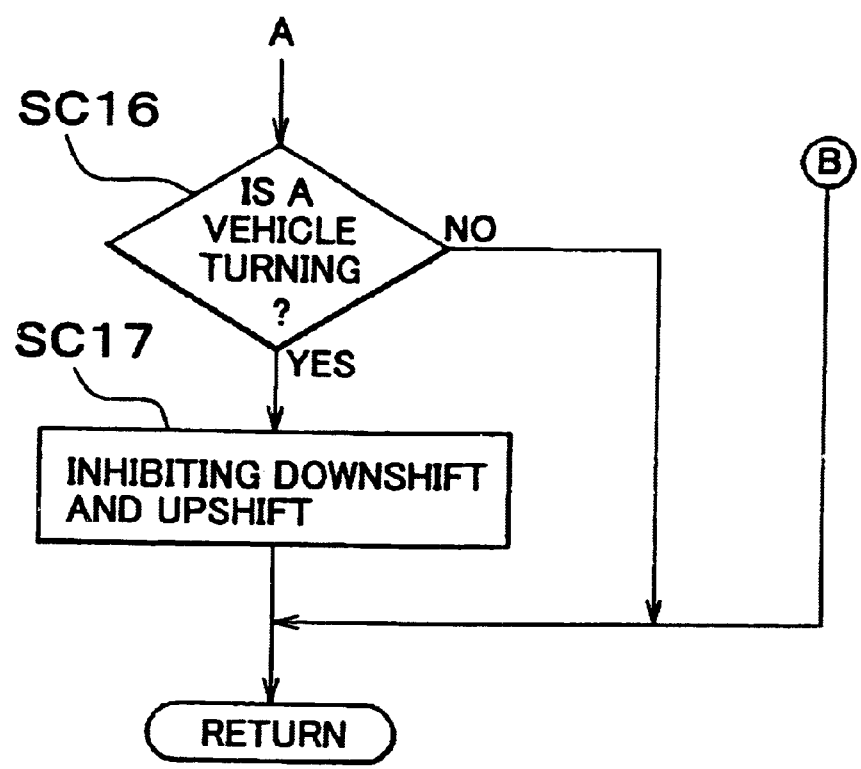
FIG. 9 is another part of the flow chart illustrating a main portion of the cooperative gear change control operation in the electronic control apparatus for controlling the gear change shown in FIG. 1.

FIGS. 8 and 9 are flowcharts illustrating a main portion of the control operation of the gear change electronic control apparatus 78 mentioned above. The flowcharts are executed when the vehicle enters the curve area mentioned above. In FIGS. 8 and 9, at a step SC1 (hereinafter, the word "step" will be omitted) corresponding to the drive operation determining means 98 and the like, there are read the drive operation such as the pedaling operation of the brake pedal 68, the releasing operation of the accelerator pedal 50 and the like, and the navigation information represented by the signal from the navigation apparatus 84, for example, the traveling direction of the vehicle, the road shape in the traveling direction and the like. Next, at SC2 corresponding to the road surface inclination detecting means 94 and the road surface curve detecting means 96, the inclination of the vehicle traveling road, that is, the slope θ R is calculated on the basis of the difference between the previously stored reference acceleration in the flat road surface and the actual vehicle acceleration in accordance with the previously stored relation, and the curvature radius R within the curve area of the road located in front of the vehicle is calculated on the basis of the signal from the navigation apparatus 84.

Next, at SC3 corresponding to the express way determining means 106, it is determined on the basis of the signal from the navigation apparatus 84 whether or not the vehicle travels on the express way. In the case where a negative determination is made at SC3, SC5 and the steps subsequent to the SC5 are executed. In the case where an affirmative determination is made, the downshift operation is suppressed at SC4 corresponding to the downshift suppressing means 108, for example, by canceling the downshift operation to the third speed on the downshift map in FIG. 5 and the like, and the upshift operation is promoted.

Next, at SC5 corresponding to the winding road determining means 102, it is determined on the basis of the signal from the navigation apparatus 84 whether or not the road in front of the vehicle is a winding road having a continuous curve. In the case where a negative determination is made at SC5, SC7 and the steps subsequent to the SC7 are executed. In the case where an affirmative determination is made, the downshift operation is promoted at SC6 corresponding to the downshift promoting means 104 by changing the downshift operation to the fourth speed gear stage shown in FIG. 5 to the downshift operation to the third speed gear stage, and the upshift operation is suppressed.

At the SC7, it is directly determined whether the downshift operation of the automatic transmission 14 should be executed on the basis of the curvature radius R (the curve information with respect to the road curve) of the actual road, the actual road surface inclination θ R (the road surface inclination information with respect to the road surface inclination), and the drive operation such as the accelerator releasing operation, the brake operation and the like, in accordance with the previously stored shift map in FIG. 5. In the case where an affirmative determination is made at the SC7, the downshift operation is commanded such that the downshift operation is executed taking precedence over the gear change operation of the automatic gear change control means 90 at SC9. The SC7 and SC9 correspond to the downshift command means 100. In the case where a negative determination is made at the SC7, it is determined at SC8 whether or not the actual gear stage of the automatic transmission 14 is the highest speed gear stage, that is, the fifth speed gear stage. In the case where an affirmative determination is made, SC16 and the steps subsequent to the SC16 described below are executed. In the case where a negative determination is made, SC10 subsequent to the SC9 and the steps subsequent to the SC10 are executed.

At the SC10, it is directly determined whether the upshift operation of the automatic transmission 14 should be executed on the basis of the curvature radius R (the curve information with respect to the curve of the road) of the actual road and the actual road surface inclination θ R (the road surface inclination information with respect to the road surface inclination), in accordance with the previously stored upshift map in FIG. 6. In the case where an affirmative determination is made at the SC10, the upshift operation is commanded such that the upshift operation is executed taking precedence over the gear change of the automatic gear change control means 90 at SC13, which is a step executed when negative determinations are made at SC11 and SC12 as described below. The SC10 corresponds to the upshift inhibition command means 112.

When an affirmative determination is made at the SC10, at the SC11 corresponding to the engine rotational speed determining means 116, it is determined whether or not the engine rotational speed NE becomes equal to or more than the predetermined value NE1, for example, approximately 4,000 to 5,000 r.p.m. In the case where a negative determination is made at the SC11, at the SC12 corresponding to the vehicle speed determining means 118, it is determined whether or not the vehicle speed V becomes equal to or higher than the predetermined value V1, for example, approximately 120 km/h. In the case where negative determinations are made at both of the SC11 and SC12, the upshift operation is executed at the SC13. However, in the case where an affirmative determination is made at one of the steps, at SC14 and SC15 corresponding to the reconverting means 120, the cooperative gear change control is finished, and the control mode is reconverted to the normal automatic gear change control mode using the gear change graph in FIG. 4.

Then, at SC16, it is determined on the basis of the transverse acceleration detected by the G sensor mounted on the vehicle, the wheel speed difference between right and left, the steering angle of the steering wheel, the gyro signal mounted on the navigation apparatus 84 and the like whether or not the vehicle is turning. In the case where a negative determination is made at the SC16, the routine is finished. In the case where an affirmative determination is made, both of the downshift operation executed by the downshift command means 100 during the turning travel and the upshift operation at the SC13 are inhibited in order to maintain a stability of the vehicle motion at SC17. The SC16 and SC17 correspond to the turning travel determining means 114.

As mentioned above, according to the embodiment of the invention, in the case of executing the cooperative gear change control of the automatic transmission 14 on the basis of the information with respect to the condition around the vehicle or in front of the vehicle, in the cooperative gear change control means 92, the gear change of the automatic transmission 14 is directly determined on the basis of the actual curve information (the curvature radius R of the road) and the road surface inclination information (the road surface slope θ R) in accordance with the previously stored downshift map shown in FIG. 5. In addition, the gear stage is switched such that the determined gear change is executed. Therefore, it is possible to directly obtain the gear stage or the gear ratio corresponding to the curve of the road or the road surface inclination.

Further, in the cooperative gear change control means 92 according to the embodiment of the invention, the gear change of the automatic transmission 14 is directly determined on the basis of the actual curve information (the curvature radius R of the road), the road surface inclination information (the road surface slope θR) and the traveling state of the vehicle with respect to the drive operation such as the releasing operation of the accelerator pedal 50, the operation of the brake pedal 68 and the like executed by the driver, in accordance with the previously stored downshift map shown in FIG. 5. Therefore, it is possible to directly obtain the gear stage or the gear ratio corresponding to the drive operation or the traveling state of the vehicle with respect thereto.

Further, according to the embodiment of the invention, the gear change of the automatic transmission 14 is determined on the basis of the vehicle state corresponding to the right or left turning direction of the vehicle determined by the right and left curve determining means 110. Therefore, it is possible to directly obtain the gear stage or the gear ratio corresponding to the turning direction of the vehicle.

Further, according to the embodiment of the invention, the upshift map in FIG. 6 has the upshift inhibition areas A6 and A7. If it is determined by the engine rotational speed determining means 116 that the engine rotational speed NE is equal to or more than the predetermined value NE1 or it is determined by the vehicle speed determining means 118 that the vehicle speed V is equal to or higher than the predetermined value V1, the cooperative gear change control is finished and the upshift operation is allowed by reconverting the control mode to the normal automatic gear change control mode using the gear change graph in FIG. 4 in the reconverting means 120, even in the case where the points corresponding to the actual curvature radius R and the road surface inclination θ R exist within the upshift inhibition areas A6 and A7. Therefore, an engine noise and a vehicle noise can be preferably suppressed during traveling at a high vehicle or the like, and the drivability is improved, although the driving force tends to be slightly insufficient due to the upshift operation.

Further, according to the embodiment of the invention, in the cooperative gear change control means 92 executing the downshift operation when it is determined on the basis of the information on the road in front of the vehicle that the vehicle enters the curve area, the gear change of the automatic transmission 14 is inhibited in the case where it is determined by the turning travel determining means 114 that the vehicle is turning. Therefore, it is possible to preferably maintain a stability of the motion of the vehicle during the turning travel.

FIG. 10 is a view showing a relation used by a downshift allowing means in determining whether a downshift should be allowed in a modified embodiment of invention. A hatched portion shown in FIG. 10 indicates a speed reduction area calculated on the basis of the recommended vehicle speed determined from the curvature radius R of the corner of the road in the traveling direction. The speed reduction area is provided on the high vehicle speed side and the corner position side, and a speed reduction area line L showing a boundary of the speed reduction area is set so as to be moved to the high vehicle speed side and the side close to the corner according as the curvature radius R of the corner becomes larger. There may be further provided a downshift allowing means for allowing the downshift operation determined on the basis of the relation shown in FIG. 5 when the actual vehicle speed V of the vehicle traveling just before the corner area exceeds the speed reduction area line L, using the relation in FIG. 10. Thus, the downshift operation is prevented in the case where the vehicle travels at a low speed or a distance D from the corner is large. Therefore, the drivability is further improved.

An embodiment of the invention has been described with reference to the drawings. However, the invention can be applied to other aspects.

For example, in the vehicle according to the embodiment mentioned above, the corner in front of the vehicle and the like are determined on the basis of the signal from the navigation apparatus 84 provided in the vehicle. However, the curve in front of the vehicle and the like may be determined on the basis of road information from a road information transmitting apparatus provided in the road.

In the embodiment mentioned above, the invention is applied to the control from the fifth speed gear stage to the third speed gear stage in the automatic transmission 14 with stages. However, the invention may be applied to the control with respect to the other gear stages. Further, the invention may be applied to a vehicle provided with a continuously variable transmission in which a driving belt is wound around a pair of variable pulleys having variable effective diameters. The invention can be applied even to a continuously variable transmission in which preset plural kinds of speed ratios are switched step by step or other types of continuously variable transmission.

Further, the engine electronic control apparatus 76 and the gear change electronic control apparatus 78 connected to each other via the communication circuit are provided in the vehicle according to the embodiment mentioned above. However, the control mentioned above may be executed by an arithmetic and control apparatus which is commonly provided, or may be executed by an electronic control apparatus provided in the navigation apparatus 84.

Further, the routine shown in FIGS. 8 and 9 mentioned above is executed in the cooperative gear change control mode selected when the vehicle enters the curve area. However, it is not required that the routine is always executed within the curve area, and the routine may be executed in a mountainous road, an ascending and descending slope and the like.

Further, in the embodiment mentioned above, the downshift promoting means 104 and the downshift suppressing means 108 may be constructed so as to change the area of the downshift map in FIG. 5 or correct the curvature radius R and/or the slope θ R.

Further, in the embodiment mentioned above, a plurality of areas are arranged in the downshift map in FIG. 5 and the upshift map in FIG. 6, whereby the switching of the gear stages is determined. However, in the case where a continuously variable transmission in which the gear ratio is continuously changed is used, the vertical axis and the horizontal axis may be set as continuous values and the gear ratio may be continuously switched.

While the invention has been described with reference to preferred embodiments thereof, it is to be understood that the invention is not limited to the preferred embodiments of constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A vehicular control apparatus for controlling an automatic gear change which executes a gear change control of an automatic transmission, the apparatus comprising:

a road surface inclination detecting means for detecting an inclination of a vehicle travelling road where the vehicle is travelling so as to output road surface inclination information ($\theta_R$) with respect to the inclination, a road surface curve detecting means for detecting a curve of the vehicle travelling road so as to output curve information (R) with respect to the curve, and a gear change control means for controlling a gear change of an automatic transmission on the basis of actual curve information (R) and road surface inclination information ($\theta_R$), wherein the gear change control means:

includes a map for conducting a gear change determination responding to a drive operation performed by a driver, which map is pre-set on the basis of the relationship between the road surface inclination ($\theta_R$) and the curve degree (R), determines a gear change based on the drive operation performed by the driver and the information of the road surface inclination ($\theta_R$) and the curve degree (R) from the map, and controls the gear change of the automatic transmission.

2. A vehicular control apparatus according to claim 1, wherein the road surface curve detecting means detects the curve of the vehicle travelling road that is located ahead the vehicle.

3. A vehicular control apparatus according to claim 2, wherein the road surface inclination information ($\theta_R$) and/or the curve information (R) is detected by a navigation apparatus.

4. A vehicular control apparatus according to any one of claims 1 to 3, wherein the drive operation includes an accelerator pedal releasing operation.

5. A vehicular control apparatus according to claim 4, wherein the map is set responding to the accelerator pedal releasing operation, so that the automatic transmission tends to be downshifted to a lower gear shift as the road surface inclination ($\theta_R$) becomes larger or the curve degree (R) of the road surface becomes larger.

6. A vehicular control apparatus according to any one of claims 1 to 3, wherein the drive operation includes a brake pedal operation.

7. A vehicular control apparatus according to claim 6, wherein the map is set responding to the brake pedal operation, so that the automatic transmission tends to be downshifted to a lower gear shift as the road surface inclination ($\theta_R$) becomes larger or the curve degree (R) of the road surface becomes larger.

8. A vehicular control apparatus according to any one of claims, 1 to 3, wherein:
 the vehicular control apparatus further comprises a curve determining means for determining a turning direction of the vehicle travelling road, and
 the gear change control means changes easiness of downshift of the automatic transmission responding to the curve degree (R) of the road surface and based on whether the actual turning direction of the road is right or left.

9. A vehicular control apparatus according to any one of claim 1 to 3, wherein the gear change control means executes a control such that the automatic transmission is downshifted at a lower vehicle speed (V) or at a distance (D) farther from a beginning of a corner where the road surface starts to curve, when a curve degree (R) of the corner becomes larger.

10. A vehicular control apparatus according to any one of claims 1 to 3, wherein, after the automatic transmission is downshifted by the determination of the gear change, the gear change control means prohibits an upshift based on information of the actual road surface inclination ($\theta_R$) and the curve degree (R) of the road surface and prohibits an upshift to higher gear as the road surface inclination ($\theta_R$) becomes larger or the curve degree (R) of the road surface becomes larger.

11. A vehicular control apparatus according to any one of claims 1 to 3, wherein the gear change control means allows an upshift operation if an engine rotational speed (NE) is equal to or more than a predetermined value ($N_{E1}$) or a vehicle speed (V) is equal to or higher than a predetermined value (V1) even in the case where the upshift is prohibited based on the actual road surface inclination information ($\theta_R$) and the curve degree information (R).

12. A vehicular control apparatus according to any one of claims 1 to 3, wherein:
 the vehicular automatic transmission control apparatus further comprises a turning travel detecting means, and
 the gear change control means inhibits the gear change of the automatic transmission when it is detected that the vehicle is turning.

13. A vehicular control apparatus according to any one of claims 1 to 3, wherein:
 the vehicular automatic transmission control apparatus further comprises an expressway detecting means, and
 the gear change control means suppresses a downshift in the case where it is detected that the vehicle is travelling on the expressway.

14. A vehicular control method for controlling an automatic gear change, comprising the steps of:
 detecting an inclination of a vehicle travelling road where the vehicle is travelling to output road surface inclination information ($\theta_R$) with respect to the inclination,
 detecting a curve of the vehicle travelling road so as to output curve information (R) with respect to the curve,
 controlling a gear change of an automatic transmission on the basis of actual curve information (R) and road surface inclination information ($\theta_R$), on the basis of a map for conducting a gear change determination responding to a drive operation performed by a driver, which map is pre-set on the basis of the relationship between the road surface inclination ($\theta_R$) and the curve degree (R), wherein
 a gear change is determined based on the drive operation performed by the driver and the information of the road surface inclination ($\theta_R$) and the curve degree (R) from the map, and wherein
 the gear change of the automatic transmission is controlled.

15. A vehicular control method according to claim 14, wherein the curve is a curve of the vehicle travelling road that is located ahead the vehicle.

16. A vehicular control method according to claim 15, wherein the road surface inclination information ($\theta_R$) and/or the curve information (R) is detected by a navigation apparatus.

17. A vehicular control method according to any one of claims 14 to 16, wherein the map is set responding to an accelerator pedal releasing operation or to a brake pedal operation as a drive operation performed by a driver, wherein the automatic transmission tends to be downshifted to a lower gear shift according as the road surface inclination ($\theta_R$) becomes larger or the curve degree (R) of the road surface becomes larger.

18. A vehicular control method according to any one of claims 14 to 16, wherein, after the automatic transmission is downshifted by the determination of the gear change, an upshift is prohibited based on information of the actual road surface inclination ($\theta_R$) and the curve degree (R) of the road surface, and an upshift to a higher gear is prohibited when the road surface inclination ($\theta_R$) becomes larger or the curve degree (R) of the road surface becomes larger.

19. A vehicular control method according to any one of claims 14 to 16, wherein the control is executed such that the automatic transmission is downshifted at a lower vehicle speed (V) or at a distance (D) farther from a beginning of a corner where the road surface starts to curve when the curve degree (R) of the road surface becomes larger.

20. A vehicular control method according to any one of claims 14 to 16, wherein the gear change of the automatic transmission is inhibited when it is detected that the vehicle is turning.

21. A vehicular control method according to any one of claims 14 to 16, wherein a downshift is suppressed in the case where vehicle travelling road is an expressway.

* * * * *

UNITED STATES PATENT AND TRADEMARK OFFICE
CERTIFICATE OF CORRECTION

PATENT NO.     : 6,626,797 B2
DATED          : September 30, 2003
INVENTOR(S)    : Kazuyuki Shiiba et al.

It is certified that error appears in the above-identified patent and that said Letters Patent is hereby corrected as shown below:

<u>Title page,</u>
Item [75], Inventors, after "Kazuyuki Shiiba", change "Toyota" to -- Susono --; after "Yoji Takanami", change "Toyota" to -- Anjo --; after "Hideo Tomomatsu", change "Toyota" to -- Nagoya --; after "Yoshio Ito", change "Toyota" to -- Susono --; after "Teru Konishi", change "Anjo" to -- Okazaki --; and after "Masao Kawai", change "Anjo" to -- Chiryu --.

Signed and Sealed this

Eighth Day of June, 2004

JON W. DUDAS
*Acting Director of the United States Patent and Trademark Office*